US012288303B2

(12) United States Patent
da Silva Pratas Gabriel et al.

(10) Patent No.: US 12,288,303 B2
(45) Date of Patent: Apr. 29, 2025

(54) RENDERING A VIRTUAL OBJECT IN SPATIAL ALIGNMENT WITH A POSE OF AN ELECTRONIC DEVICE

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Alexandre da Silva Pratas Gabriel, The Hague (NL); Hans Maarten Stokking, Wateringen (NL); Tessa Esmeé Klunder, Almere (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 200 days.

(21) Appl. No.: 18/083,352

(22) Filed: Dec. 16, 2022

(65) Prior Publication Data

US 2023/0206575 A1 Jun. 29, 2023

Related U.S. Application Data

(60) Provisional application No. 63/266,038, filed on Dec. 27, 2021.

(51) Int. Cl.
*G06T 19/20* (2011.01)
*G06T 7/73* (2017.01)

(52) U.S. Cl.
CPC ............. *G06T 19/20* (2013.01); *G06T 7/74* (2017.01); *G06T 2219/2004* (2013.01)

(58) Field of Classification Search
CPC .... G06T 19/20; G06T 7/74; G06T 2219/2004
See application file for complete search history.

(56) References Cited

U.S. PATENT DOCUMENTS

2008/0280676 A1* 11/2008 Distanik .............. G07F 17/32
                                                                        463/31
2014/0152558 A1* 6/2014 Salter .................. G06F 3/013
                                                                        345/157
(Continued)

FOREIGN PATENT DOCUMENTS

EP          3200086 A1    8/2017
JP       2012233962 A  * 11/2012
(Continued)

OTHER PUBLICATIONS

Yujin Li; Lei Sun; Wenye Wang, Exploring device-to-device communication for mobile cloud computing, IEEE (Year: 2014).*
(Continued)

*Primary Examiner* — Daniel F Hajnik
*Assistant Examiner* — Chris Alejandro Puntier
(74) *Attorney, Agent, or Firm* — Hamilton, Brook, Smith & Reynolds, P.C.

(57) ABSTRACT

A method of rendering a virtual object by a rendering device includes establishing a communication channel with a mobile device; determining or receiving initial pose information of the mobile device, the pose information defining an initial position and an initial orientation; receiving device information via the communication channel, the device information including orientation, motion, and/or position information for updating the initial pose of the mobile device; using the initial pose information and the device information to determine a current pose of the mobile device, the current pose defining a current position and orientation; receiving first content data from a server system, the first content data representing a virtual object; and, rendering the first content data in the viewport of the rendering device based on the current pose information, the
(Continued)

current pose information being used to render the virtual object in spatial alignment with the mobile device.

15 Claims, 6 Drawing Sheets

(56) References Cited

U.S. PATENT DOCUMENTS

| | | | |
|---|---|---|---|
| 2014/0197232 A1* | 7/2014 | Birkler | H04L 63/08 235/375 |
| 2014/0232637 A1 | 8/2014 | Park et al. | |
| 2016/0011657 A1 | 1/2016 | Estacio | |
| 2017/0168296 A1* | 6/2017 | Giwnewer | G06F 1/00 |
| 2018/0374269 A1* | 12/2018 | Smith | G06K 7/1413 |
| 2021/0350633 A1 | 11/2021 | Huang | |

FOREIGN PATENT DOCUMENTS

| | | |
|---|---|---|
| WO | 2019018098 A1 | 1/2019 |
| WO | 2021244187 A1 | 12/2021 |

OTHER PUBLICATIONS

JP-20122233962-A; Yoshida H; English machine translation (Year: 2012).*

Extended European Search Report issued for EP Application No. 22150319.6, dated May 27, 2022.

Normand et al. Enlarging a Smartphone with AR to create a handheld VESAD (Virtual Extended Screen-Alignment Display), IEEE International Symposium on Mixed and Augmented Reality (ISMAR) Oct. 16-20, 2018.

* cited by examiner

RENDERING A VIRTUAL OBJECT IN SPATIAL ALIGNMENT WITH A POSE OF AN ELECTRONIC DEVICE

RELATED APPLICATION

This application is claims the benefit of U.S. Provisional Application No. 63/266,038, filed on Dec. 27, 2021. The entire teachings of the above application is incorporated herein by reference.

TECHNICAL FIELD

The invention relates to rendering a virtual object in alignment with a pose of an electronic device, and, in particular, though not exclusively, to methods and systems for rendering a virtual object in alignment with a pose of an electronic device, and a computer program product for executing such methods.

BACKGROUND

In augmented reality (AR) or mixed reality (MR), computer generated graphics may be used to augment physical reality perceived by a viewer. For example, a head-worn rendering device, such as AR glasses, may be configured to render computer-generated graphics, e.g. in the form of 2D or 3D objects, and display these objects in such a way that they are overlaid, mixed, blended or in any other way visually combined with a scene the user of the rendering device is looking at. This way, the real world seen by a user may be augmented with digital content, such as informative content (e.g., navigation directions) or entertainment (e.g., game characters), etc. Such objects may also be rendered to augment a video-based representation of the physical reality the user is looking at. For example, the head-worn rendering device may include a forward-facing camera and may record and display the recorded video in real-time or near real-time to a viewer while augmenting the video with computer-generated graphics. Also, other types of videos may be augmented with 3D graphics objects. For example, in Virtual Reality (VR), a so-called panoramic video or omnidirectional video may be augmented with one or more 3D graphics objects. AR, MR or VR are together also referred to as eXtended Reality (XR).

Normand et. al. Enlarging a Smartphone with AR to create a handheld VESAD (Virtual Extended Screen-Alignment Display), IEEE International Symposium on Mixed and Augmented Reality (ISMAR) 16-20 Oct. 2018, describe in their article a use case wherein an experimental AR head mounted device HMD is configured to virtually extend a screen of a mobile display device that is held by the user of the HMD. The VESAD includes an HMD and a camera capturing images of the field of view of the user of the HMD. The HMD includes an image processor configured to determine the orientation of a mobile device based on tracking markers attached to the mobile device. Based on the orientation, the 3D rendering engine of the HMD can determine how a virtual object, a virtual screen, should be rendered in the FOV of the user so that it is in alignment with the physical screen the user is looking to.

Although the authors provided some mock-up illustrations of use cases wherein a screen of a mobile phone could be extended beyond its physical limits, in practice relatively large physical markers attached to the mobile phone are necessary to determine the position and orientation of the mobile device relative to the rendering device, which can both freely move. The use of such physical tracking markers however is not suitable for real-live situations. Without markers continuously (in real-time) determining the position and orientation of the device based on image processing is a particular complex and resource intensive process.

Hence, from the above, it follows there is need in the art for improved schemes for rendering virtual objects in spatial alignment with an electronic device. In particular, there is a need in the art for improved schemes for extending of a physical screen of a mobile device with a virtual extension without affecting the immersive AR experience of the user.

SUMMARY

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the person's computer, partly on the person's computer, as a stand-alone software package, partly on the person's computer and partly on a remote computer, or entirely on the remote computer or server. In the latter scenario, the remote computer may be connected to the person's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In a first aspect, embodiments are described that relate to a method of rendering a virtual object by a rendering device, wherein the method may comprise: establishing by the rendering device a communication channel with a mobile electronic device, the mobile electronic device comprising an inertial measurement unit (IMU); determining or receiving initial pose information of the mobile electronic device, the initial pose information defining an initial position and an initial orientation; receiving device information via the communication channel, the device information including orientation information, motion information, and/or position information for updating the initial pose of the mobile electronic device, at least part of the orientation information and/or motion information being generated by the IMU; using the initial pose information and the device information to determine a current pose of the mobile electronic device, the current pose defining a current position and orientation; receiving first content data from a server system, the first content data representing a virtual object; and, rendering the first content data in the viewport of the rendering device based on the current pose information, wherein the current pose information is used spatial align the virtual object with the mobile electronic device.

In an embodiment, the initial pose information may define an initial position and an initial orientation of a first plane of the electronic device and the content data may represent a virtual object associated with a second plane and wherein during the rendering of the first content data in the viewport of the rendering device the current pose information is used to render the second plane of the virtual object in spatial alignment with the first plane of the electronic device.

The method enables rendering of content data representing a virtual object that is in alignment with a pose of an electronic device, without the need to continuously process and analyze pictures of the electronic device to derive pose information, an initial position and orientation and a current position and orientation. Examples of such electronic devices may include a mobile display device, a movable robot or a drone. The pose of the electronic device may be at least partially determined on the basis of sensor information, i.e. sensor information of the IMU, that is sent to the rendering device over the communication channel between the electronic device and the extended reality rendering device.

Additionally, the method enables accurate monitoring of the orientation of the mobile display device without the need to fully rely on image processing algorithms such as object tracking. During rendering, the Rendering device may receive regularly or (almost) continuously orientation information of the mobile display device that is generated by an Inertial Measurement Unit (IMU) of the mobile display device and that is sent via a communication channel, such as a direct wireless communication channel, to the Rendering device. The invention allows accurate updates of relatively complex changes in the orientation of the screen in time without the need to deal with issues of complex image processing algorithms and without the need to rely on computational resources that are needed by such image processing algorithms.

In some embodiments the electronic device may include a GPS system for determining position information which can be sent in the device information to the rending device. Additionally, and/or in addition, a positioning system, e.g. a triangulation system, may be used to determine position information of the electronic device, which may be sent to the rending device.

In an embodiment, the mobile electronic device may be an electronic display device and the virtual object may be a virtual plane which is in co-planar spatial alignment with the screen plane of the electronic display device for extending the physical display of the electronic display device.

In an embodiment, the device information may further include at least one of: information about the physical dimensions of the mobile electronic device and/or physical dimensions of the display of the mobile electronic device, information about a screen ratio of the mobile electronic device, color information associated with the display of the mobile electronic device, a model number of the mobile electronic device, information of a presentation time and/or clock time the orientation, motion and/or position of the mobile display device was measured.

In an embodiment, determining initial pose information may further include: using a depth sensor or a depth camera to determine the distance between the mobile display device and the XR rendering device; and, determine the initial position of the mobile electronic device based on the distance.

In an embodiment, determining initial pose information may further include: determining an initial orientation of the mobile electronic device based on tracking the mobile electronic device in pictures generated by a camera of the XR rendering device and based on image processing of the tracked electronic device in the pictures; or, receiving an initial orientation of the mobile display device via the communication channel, the initial orientation being determined by the inertial measurement unit of the mobile display device.

In an embodiment, the communication channel may be a wireless communication channel between the mobile electronic device and the XR display device, preferably the wireless communication channel based on a wireless standard such as a Bluetooth protocol, a WiFi protocol, Airplay, Chromecast.

In an embodiment, the communication channel between the mobile electronic device and the XR rendering device may be established via the server system.

In an embodiment, the virtual object may represent a virtual display extension of a display of the mobile electronic device, preferably the virtual display extension being in co-planar alignment with the display, wherein the virtual display extension provides an extended view of the content that is played back by the mobile display device.

In a further aspect, embodiments may relate to a rendering device comprising: a computer readable storage medium having computer readable program code embodied therewith, and a processor, preferably a microprocessor, coupled to the computer readable storage medium, wherein responsive to executing the computer readable program code, the processor is configured to perform executable operations comprising: establishing a communication channel with a mobile electronic device, the mobile electronic device comprising an inertial measurement unit IMU; determining or receiving initial pose information of the mobile electronic device, the initial pose information defining an initial position and an initial orientation; receiving device information via the communication channel, the device information including orientation information, motion information, and/or position information for updating the initial pose of the mobile electronic device, at least part of the orientation information and/or motion information being generated by the IMU; using the initial pose information and the device information to determine a current pose of the mobile electronic device, the current pose defining a current position and orientation; receiving first content data from a server system, the first content data representing a virtual object; and, rendering the first content data in the viewport of the rendering device based on the current pose information, wherein the current pose information is used to spatially align the virtual object with the mobile electronic device.

In an embodiment, the device information may further include at least one of: information about the physical dimensions of the mobile electronic device and/or physical dimensions of the display of the mobile electronic device, information about a screen ratio of the mobile electronic device, color information associated with the display of the mobile electronic device, a model number of the mobile electronic device, information of a presentation time and/or clock time the orientation, motion and/or position of the mobile display device was measured.

In an embodiment, determining initial pose information may further include: using a depth sensor or a depth camera to determine the distance between the mobile electronic device and the rendering device; and, determine the initial position of the mobile electronic device based on the distance.

In an embodiment, determining initial pose information may further include: determining an initial orientation of the mobile electronic device based on tracking the mobile electronic device in pictures generated by a camera of the rendering device and based on image processing of the tracked electronic device in the pictures; or, receiving an initial orientation of the mobile display device via the communication channel, the initial orientation being determined by the inertial measurement unit of the mobile display device.

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

DESCRIPTION OF THE EMBODIMENTS

Figure 1B:
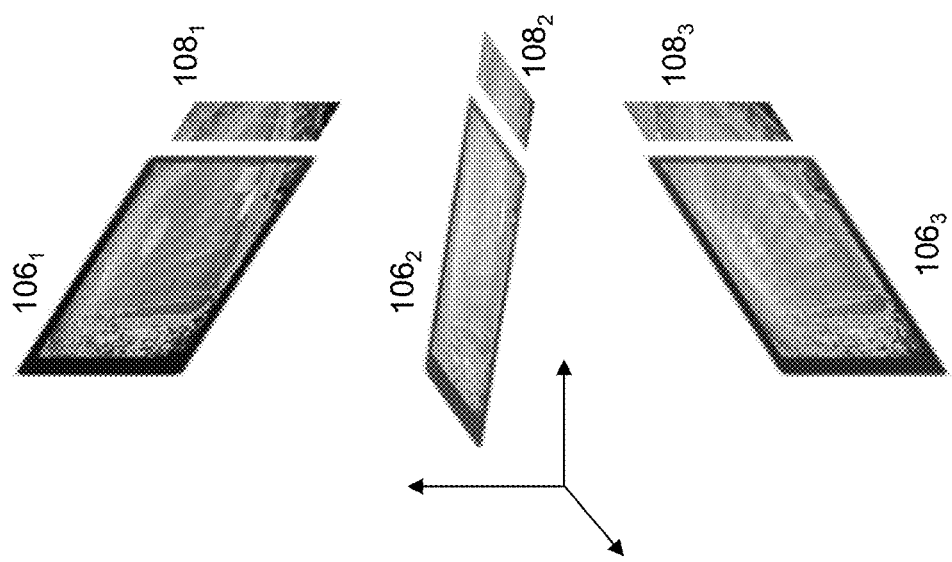
FIGS. 1A and 1B depict examples of aligning a virtual screen with a display of a mobile display device.

The embodiments in this application aim to enable a rendering device, such as an extended reality rendering device, to render content data representing a virtual object that is in alignment with an electronic device, wherein the pose of the electronic device is at least partially determined on the basis of information that is sent by the electronic device to the extended reality rendering device over a communication channel between the electronic device and the rendering device. The sensor information may be generated by one or more sensors, e.g. an IMU, in the electronic device and may include information about orientation, motion and/or position of the electronic device. The term electronic device in this application refers to an electronic device capable of establishing a communication channel with other electronic devices and capable of producing sensor information as described above. Such electronic devices may include Internet-of-Things (IoT) devices, mobile display devices, movable robots and/or drones. In a further embodiment, the electronic device may be a further rendering device, such as an XR rendering device, worn by another user.

A rendering device referred to in this application may be an extended reality XR rendering device configured to display the rendered content data, e.g. virtual objects, in a viewport of a scene. In an implementation such the rendering device may be a see-through rendering device wherein 3D virtual objects are rendered on a transparent or semi-transparent display. When a user looks trough the display to a real-world scene, virtual objects on top of the real-world scene will be visible for the user. The rendering device typically may include a tracking camera and sensors for tracking objects in the user's viewport and for determining a viewing orientation of the user of the rendering device. This information may be used by the rendering device to display virtual objects in a spatial and temporal relation with objects in the real-word scene. In another implementation the rendering device may be a pass-through rendering device which may include a tracking camera and sensors similar to the see-through rendering device. However, in such implementation, the rendering device does not comprise (semi) transparent display. Instead, video data of the user's viewport captured by the tracking camera are blended with generated virtual objects based on the tracking and sensor information so that the video data represent a video representation of the real-word scene and the virtual objects. These video data are subsequently displayed as a viewport to the user.

Alignment of rendered content, e.g. a virtual 3D object, with a static physical object may be realized by object tracking and image analysis of tracked objects in images captured by a tracking camera of a rendering device. A tracking algorithm may detect the physical object in the images and track this object in subsequent images, while an image processing algorithm may determine an orientation of the object and a depth sensor or a depth camera of the rendering device may be used to determine a distance between the camera and the object. FIG. 1A depicts a first scene 105 that is visible to user 101 as a viewport of a rendering device 103 e.g. a wearable mobile rendering device such as a head mounted device HMD or AR glasses. The scene visible to the user may include a static object, in this example a physical (real-world) display device 102, e.g. a TV screen, positioned in a 3D space e.g. a room and a virtual screen 104 which is rendered in the viewport of the viewer. Here, spatial alignment of the virtual screen with the screen of the display device may be realized by tracking the TV screen in images captured by the tracking camera of the rendering device, determining a position based on the distance between the camera and the screen and determining an orientation of the plane of the TV screen using an image analysis algorithm. In some embodiments, also the dimensions of the TV screen may be determined. Based on the position and orientation of the screen and the dimensions of the screen, the rendering engine may render a virtual screen having a plane that is in co-planar alignment with the plane of the TV screen. Aligning an edge of the screen with an edge of the virtual screen allows functional extension of the TV screen beyond its physical boundaries. For a static object such as a TV screen, the alignment must be updated each time the user of the rendering device moves relative to the TV screen. However, when the physical object is a mobile electronic device, e.g. a mobile phone, a tablet, a robot or a drone, then the alignment becomes more complex because the rendering device and the electronic device may move relative to each other in 6 degrees of freedom.

Figure 1A:
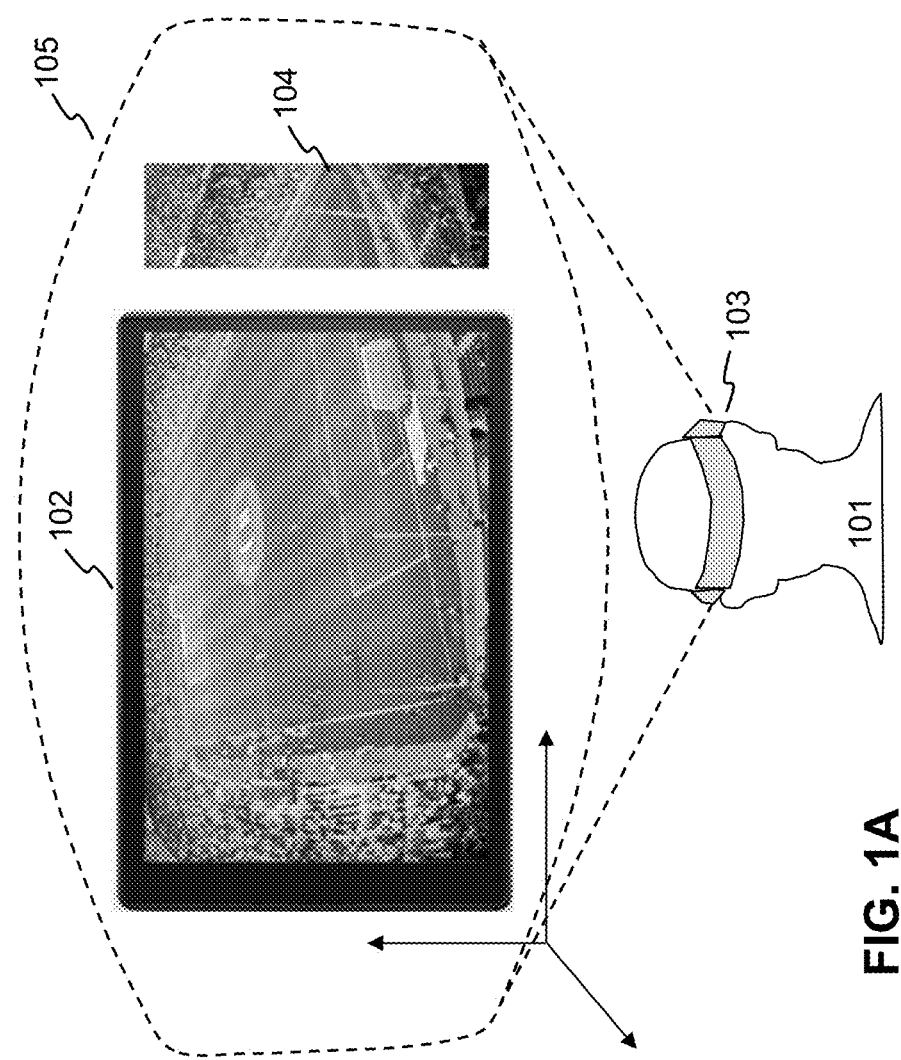

FIG. 1B depicts various scene wherein the physical display device is a mobile physical display device, e.g. a mobile phone or a tablet, that can freely move in 6 degrees of freedom relative to the rendering device. Hence, in this case the position and the plane of the physical display device may have an arbitrary position and orientation in space. In that case, the image processor of the rendering device needs to track the position and orientation of the freely movable physical mobile display device. As shown in this figure, depending on the movements of a user and/or the mobile display device, the mobile display device may be in different positions and orientations $106_{1-3}$ relative to the user of the rendering device, making tracking and determination of orientation of the screen without the help of clearly recognizable physical markers attached to the mobile display device and the rendering of a virtual screen $108_{1-3}$ in alignment with mobile display device for each of these positions a complex task. More generally, real-time rendering of virtual objects in relation to freely movable objects in the view port of the user is problematic for various reasons. Problems may relate to scale changes caused by changes in the distance between the camera and the target, rotations of the camera, perspective distortion due to changes in the perspective between the object and the camera, motion blur due to fast camera movement, occlusion of the object during camera movements and out-of-view situations wherein part of the object is out of the field of view of the camera. Improving the image processing for all these issues is very difficult. Additionally, continuous real-time image analysis is resource intensive, which is problematic for portable devices, such as an HMD, that has a limited battery.

To address these problems, the embodiments in this application aim provide a rendering device with sensor information of an inertial measurement unit (IMU) of a mobile device a user of the rendering device is looking at. To that end, a communication link between the rendering device and the mobile device may be established. Based on the sensor information, the rendering device can determine the pose (the position and orientation) of the mobile device, in particular the screen of a physical display device. The rendering device can determine the pose of the mobile physical device without the need for continuous object tracking and pose calculation based on the video frames captured by tracking cameras of the rendering device. This way, problems in the prior art may be eliminated or at least substantially reduced. Additionally, information about the physical dimensions of the mobile device may be sent over the communication channel to the rendering device, so that it can use this information when rendering an object, e.g. a virtual screen, in alignment with the mobile device. The information sent by the electronic device to the rendering device such information about the orientation, motion and/or position of the electronic device may be referred to as device information.

Figure 2:
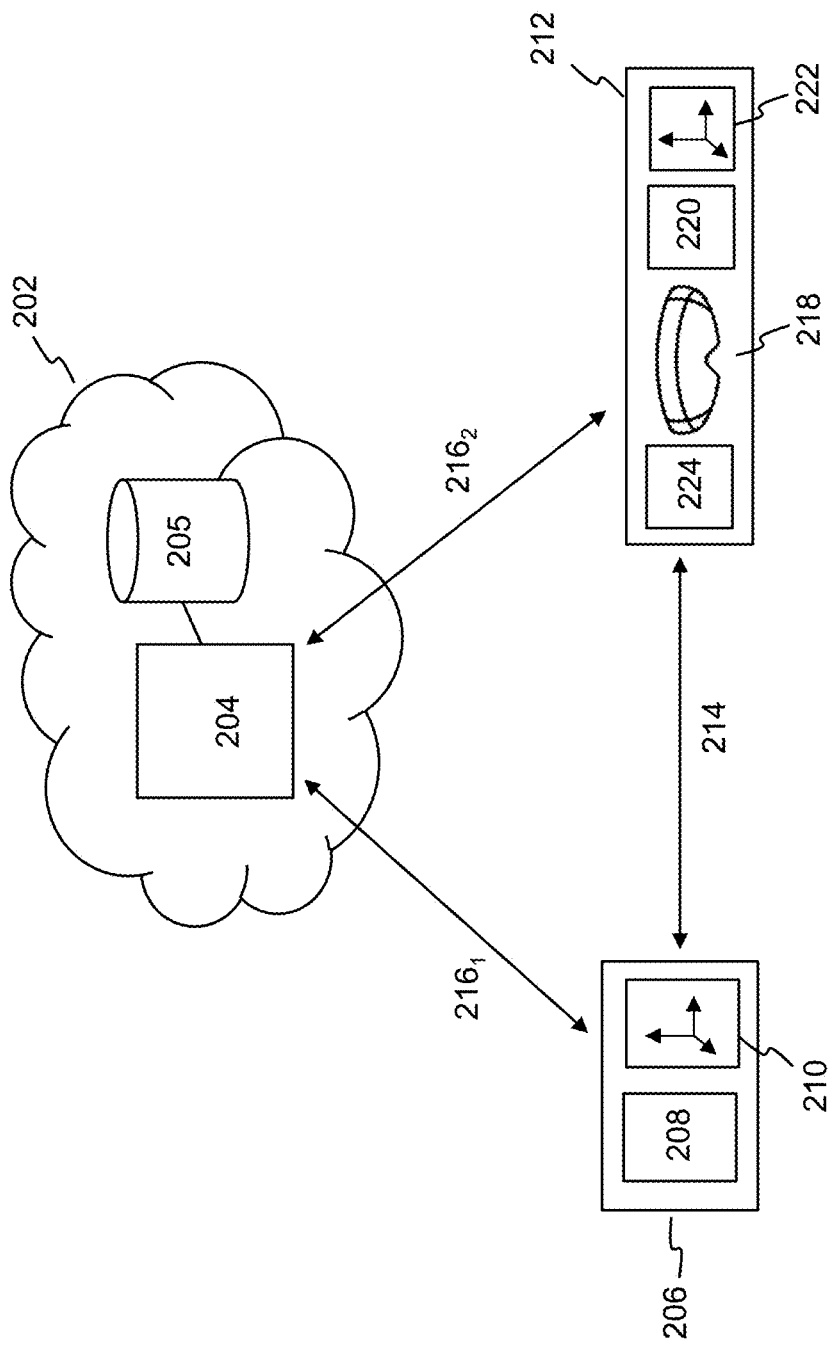
FIG. 2 depicts a system for rendering a virtual object in spatial alignment with a pose of an electronic device according to an embodiment of the invention.

FIG. 2 depicts a system for rendering a virtual object in spatial alignment with a pose of an electronic device according to an embodiment of the invention. In particular, FIG. 2 shows a schematic of a high-level architecture of a system including a backend system 202 including one or more server systems 204 and one or more media storage systems 205 and a frontend system comprising an electronic device 206 and a rendering device 212. The server systems may be part of a content delivery system (CDN) or a cloud streaming system.

The electronic device may include a radio module and a client device for setting up a first communication channel $216_1$ with the backend. The electronic device may further include a sensor module 210 configured to measure orientation information associated with the display device, i.e. information representing the orientation of the display or information for determining the orientation. The sensor module may comprise an inertial measurement unit (IMU), which is a well-known sensor device that includes one or more (combinations of) multi-axis gyroscopes, accelerometers, and/or magnetometers for accurately determining changes in the position and/or orientation of the electronic device. In an embodiment, the IMU may be configured to determine an absolute orientation of the electronic device. Further, in some embodiments, the electronic device may include a GPS system for determining a position which can be sent in the device information to the rending device. The electronic device may be configured to establish a communication link $216_1$, e.g. a wireless communication link, with the backend. Additionally, in some embodiments, the electronic device may be configured to establish a direct wireless communication link 214 with other electronic devices, such as the rendering device. The wireless communication link may be a Bluetooth connection, a Wi-Fi connection or any other wireless communication connection based on a wireless protocol to establish a wireless connection between the electronic device and the rendering device. In various embodiments, the electronic device may be a mobile phone, a tablet, an XR rendering device such as a HMD or XR glasses, an Internet-of-Things IoT device, a mobile robot or an unmanned aerial vehicle UAV such as a drone.

In some embodiments, the electronic device may comprise a display 208 or may be (wirelessly) connected to a display. In that case, the electronic device may form an electronic display device. Such electronic display device may include a client device for requesting transmission of content data in a first content stream to the electronic device. The client device may process the content data for playback on the display 208, i.e. a screen of certain physical dimensions. In an embodiment, the display may be a conventional 2D display. In another embodiment, the display may be a multi-view display or a holographic display enabling a multi-view or holographic view of the content respectively. In some embodiments, the electronic display device may be handheld device, e.g. a mobile phone or a tablet, which can be freely moved (translated/rotated) by the user.

The rendering device may include a processor configured to control a client device for setting up a second communication channel $216_2$ with the backend and to control and process second content data received in a second content stream for rendering on the display. Here, part of the content data received by the rendering device may include data representing 3D models, texture data or point cloud data, which may be used by the rendering device to augment a scene of the real world of a user of the rendering device is looking at. For example, the rendering device may be implemented as a head-mounted display (HMD), which is configured to augment a scene of the real world in a direction the user is looking (the viewer direction) with virtual objects that are rendered by a rendering engine 220 on the basis of that content data it receivers.

The rendering device may further include an inertial measurement unit IMU for generating sensor information associated with the user of the rendering device. The sensor information may include information about the viewing direction and orientation of the user of the rendering device. The sensor information may be used by the rendering engine of the rendering device to position the user in a virtual 3D space that is used by the rendering engine to position virtual objects in relation with objects in a scene the viewer is looking at and to determine a viewport based on the objects in the virtual 3D space. To that end, the rendering device may include camera and a depth sensor or a depth camera to capture pictures of the scene in the direction the user is looking and to track objects in the scene and to determine orientations and distances between tracked objects and the rendering device.

In FIG. 2, electronic device 206 may be a device the user of the rendering device is looking at. In that case, the electronic device may be visible as on object in the viewport of the rendering device, wherein the electronic device may be characterized by a pose, i.e. a position and an orientation, which may change in time. In that case, the rendering display device needs to determine the pose of the mobile display device in time, so that it can render objects in a spatial relation, e.g. aligned, with the mobile display device. For example, it may render a virtual screen that is aligned and scaled with the position and size of the screen of the electronic device.

Conventional rendering devices rely on object tracking and continuous image processing of markers attached to a mobile device in order to render a virtual screen that is aligned with a mobile screen. The use of such physical markers and the reliance on continuous image processing however is problematic in realistic situations. To broach that problem, rendering device 212 may be configured to establish a communication channel with the electronic device and to use this communication channel to receive information about the orientation and/or movements of the electronic device from the electronic device.

In an embodiment, the communication channel may be a (direct) low-latency wireless communication channel, e.g. a Bluetooth channel, a WiFi channel or any other commutation protocol that can be used to establish a low-latency communication channel, between the electronic device and the rendering device. Hence, in such embodiments, a short-range wireless radio connection may be established between the electronic device and the rendering device for transmitting orientation and/or information to the rendering device. In another embodiment, a low-latency communication channel between the electronic device and the rendering device may be established via the network, e.g. via one or more servers, such as edge servers, connecting the electronic device and the rendering device to the backend.

Figure 3B:
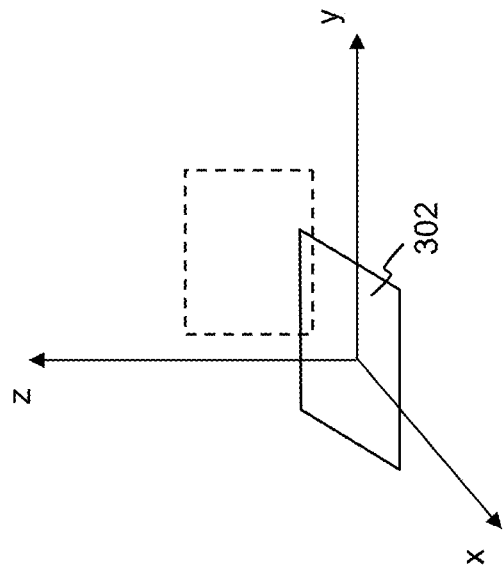
FIG. 3 depicts examples of movements in the 3D space of a display device.
Figure 3A:
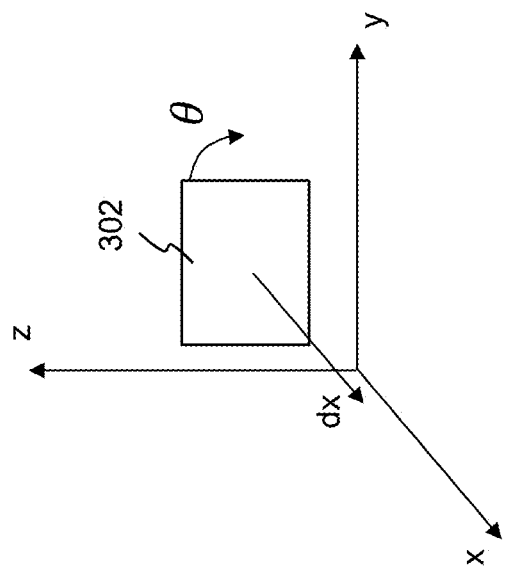

Based on the device information received from the electronic device, a current pose of the electronic device can be determined by the rendering device. This way, the rendering device can render a virtual object in the viewport that is aligned with the electronic device. Thus, during rendering, the rendering device may receive regularly or (almost) continuously information about the orientation and/or motion of the mobile display device. The invention allows fast and efficient updates of relatively complex changes in the orientation of the electronic device in time. This is for example shown in FIGS. 3A and 3B wherein a screen 302 of a tablet may have a first position and orientation at a first time instance (FIG. 3A) and a second position and orientation at a second time instance (FIG. 3B) wherein the change in position and orientation may include both translations (e.g. translations in different directions dx,dy,dz) as well as orientations, e.g. rotations around one or more of the x,y,z axis. The IMU of the electronic device may register motion and/or changes in the orientation and will send the information via the communication channel to the rendering device, that can directly use this information for updating the orientation of the virtual object that it is rendering relative to the electronic device.

In some embodiments, the electronic device may also send other information that is useful for determining (computing) the position and orientation of the electronic device relative to the rendering device.

For example, the electronic device may send information on the physical size of the screen to the rendering device. Information on the physical size of the screen may help efficiently determining the dimensions of the virtual object relative the mobile display device. Additionally, in some embodiments, besides accurate spatial alignment of a virtual object and the electronic device, also temporal alignment, i.e. synchronization, of the rendered content may be required. For example, in case the electronic device is a mobile display device, which also receives content data that needs to be played out by the mobile display device. In that case, besides orientation information, the mobile display device may also send synchronization information such as presentation time stamps via the low latency communication channel to the rendering device so that accurate synchronization can be achieved as well. Such synchronization may be useful in case the virtual object is a virtual screen extension of a video that is played back by the mobile display device.

Figure 4:
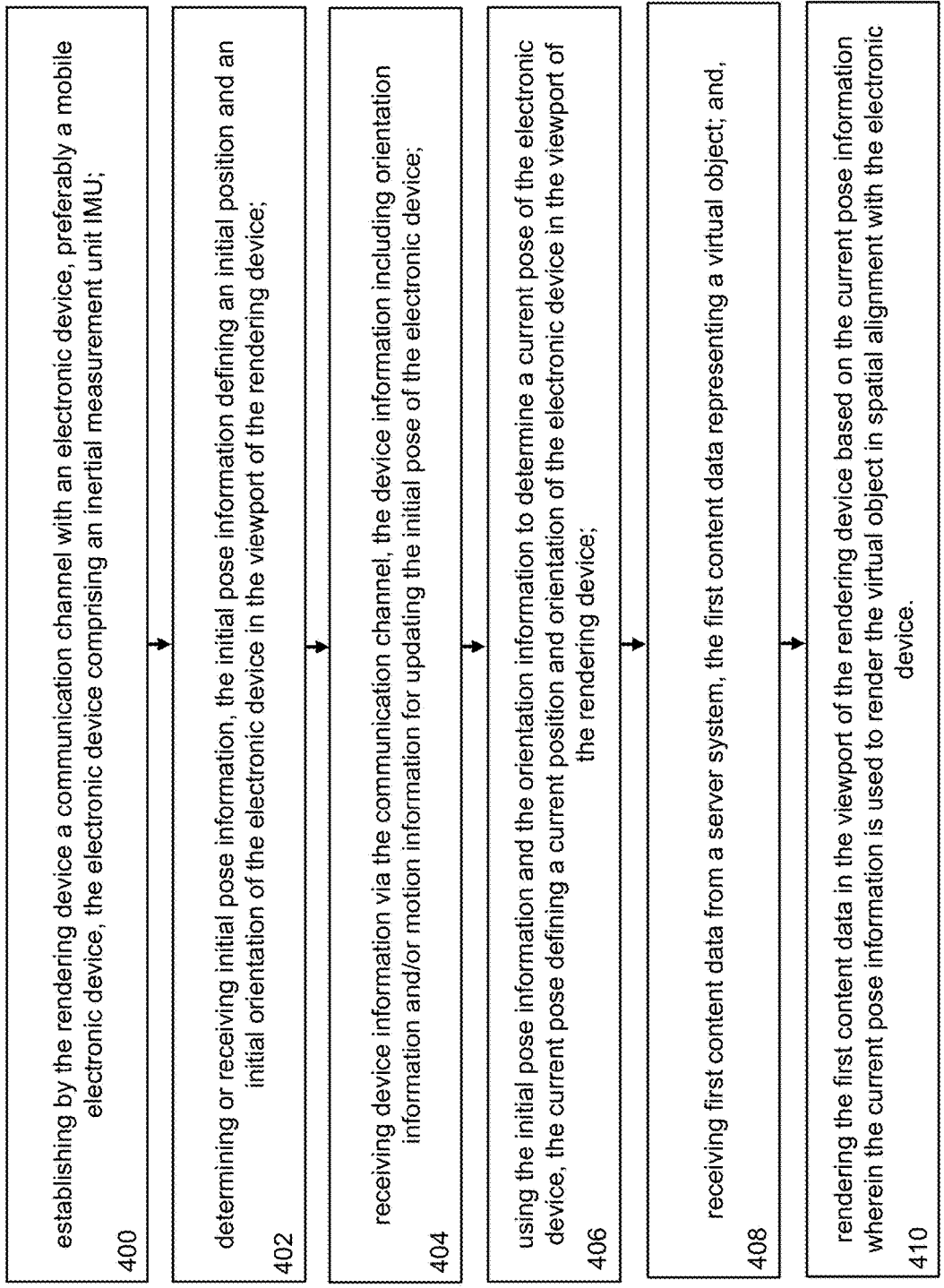
FIG. 4 depict a flow diagram of a method of rendering a virtual object by a rendering device according to an embodiment of the invention.

FIG. 4 depicts a flow diagram of a method for rendering a virtual object in spatial alignment with a pose of an electronic device according to an embodiment of the invention. As shown in this figure, the method may include a step 400 establishing by the rendering device a communication channel with an electronic device, preferably a mobile electronic device, the electronic device comprising an inertial measurement unit IMU. The method may further include a step 402 determining or receiving initial pose information, the initial pose information defining an initial position and an initial orientation of the electronic device in the viewport of the rendering device. For example, in an embodiment, the initial pose information may be determined based by image analysis of the object in the pictures generated by the tracking camera of the rendering device. Alternately, in an embodiment, the IMU of the electronic device may be configured to determine an absolute orientation, which may be sent to the rendering device over the communication channel.

In a further step 404, device information may be received via the communication channel, the device information may include orientation information and/or motion information for updating the initial pose of the electronic device. In an embodiment, the orientation information may be generated by an inertial measurement module IMU of the electronic device. Based on the initial pose information and the orientation information a current pose of the electronic device can be determined wherein the current pose defines a current position and orientation of the electronic device (step 406).

Then, first content data may be received from a server system, wherein the first content data represent a virtual object (step 408); and, in step 410 the first content data may be rendered in the viewport of the rendering device based on the current pose information, wherein the current pose information is used to spatially align the virtual object with the electronic device.

Hence, the method enables accurate monitoring of the orientation of the electronic device without the need to fully rely on image processing algorithms such as object tracking and image analysis. During rendering, the rendering device may receive regularly or (almost) continuous information about the orientation of the mobile display device that is generated by an IMU of the electronic device and that is sent via a communication channel, such as a direct wireless commutation channel, to the rendering device. The invention allows efficient and fast updates of relatively complex changes in the orientation of the screen in time without the need to deal with issues on complex image processing algorithms and without the need to rely on computational resources that are needed by such image processing algorithms.

Different methods may be used to establish a communication channel between the electronic device and the rendering device. For example, in an embodiment, the electronic device and the rendering device may use a discovery protocol to contact each other. For example, in an embodiment, the rendering device may initiate communication channel based on Bluetooth, WiFi or another suitable wireless communication standard. In an embodiment, a specific protocol such as Chromecast or Apple airplay may be used. In yet another embodiment, a communication channel may be established via the backend. For example, when the devices register with the backend, the backend may establish a communication channel that allows the electronic to send the device information via a network server to the rendering device. In yet another embodiment, the mobile display device may multicast the device information on a local network.

In some embodiments, the backend, e.g. a server system, may be configured as a rendering device which is configured to render content data and to send rendered content data to the rendering device. In that case, the electronic device may send the device information to a rendering engine at the server system, which may use the device information and sensor information including the viewing direction of the user of the rendering device from the rendering device and to render a virtual object that is in alignment with the mobile display device.

Further, the device information may include different types of information and may have different data formats. An IMU may measure acceleration or an angular rate. These measurements are of the differential type and thus cannot be used to determine information of the absolute position and orientation of the electronic device. In some embodiments, an IMU may be configured to determine an absolute orientation. Table 1 provides an overview of the different types of measurements that can be performed an IMU:

TABLE 1 different types of measurements performed by an IMU

| Measurement | Type |
|---|---|
| acceleration | Differential |
| angular rate | Differential |
| orientation | Absolute |

Errors in the measurements can accumulate causing drift which needs to be corrected based on a position tracking method. Hence, acceleration and angular rate are of the differential meaning that they cannot be used to determine the absolute position of the device. This means that given an acceleration, the rendering device may be configured to use this information to update the position and/or orientation of a virtual object that is aligned to the electronic device, however the rendering device cannot use this information to place a virtual object at an initial position in the virtual space of the rendering engine.

Hence, a bootstrap process may be used to determine the initial position and orientation of the electronic device. For example, in an embodiment, a motion tracking process may be used to determine an initial position of the physical object in the virtual 3D space of the rendering device. This may be computed based on the distance between the rendering device and the physical object, in this case the electronic device, that needs to be augmented. The distance may be determined by a depth sensor or a depth camera of the rendering device. Alternatively, the rendering device may include an RGBD camera which is configured to determine a depth map associated with an imaged picture. This way, based on the depth map and an image of the scene, the distance of an object can be determined.

Further, an initial orientation may be determined based on well-known image analysis of the object. Alternately, in an embodiment, the IMU of the electronic device may be configured to determine an absolute orientation, which may be sent to the rendering device over the communication channel. Thereafter, the IMU data will feed the rendering engine of the rendering device for updating the position and/or orientation of the object that is tracked. Hence, the bootstrap scheme may include the following steps:

1. Detect an electronic device to be tracked using a motion tracking technique;
2. Determine a position of the tracked object relative to the rendering device and determine its current orientation, wherein the distance may be calculated using a depth sensor or a camera that is configured to generate a depth map and wherein the orientation of the electronic device may be determined using a known state of the art image processing methods;
3. Transform the pose of the object in the real-world space into a pose of the object in the 3D space of the rendering engine;
4. Update the position and the orientation of the electronic device based on the motion and/or orientation information that is generated by the IMU of the electronic device and send to the rendering device and adjust the pose of the electronic device in the virtual 3D space of the rendering engine accordingly.

As already mentioned above, the electronic device may be configured to send other information than the orientation information to the rendering device as well. Table 2 provides examples of data that may be sent by the electronic device to the rendering device. This information may for example include the physical dimensions of the electronic device:

TABLE 2 examples of metadata sent to the rendering device

| Example of metadata | Example values |
| --- | --- |
| Model number | Samsung - S10.19283 |

TABLE 2-continued examples of metadata sent to the rendering device

| Example of metadata | Example values |
| --- | --- |
| Physical size of device (width and height, depth) | Width: 20 cms<br>Height: 30 cms<br>Dept: 2 cms |
| Size of bezels (top, bottom, left and right) | Top: 1 cm<br>Bottom: 1 cm<br>Left: 1 cm<br>Right: 1 cm |
| Resolution | 600 × 400 |
| Screen ratio | 3:2 |
| Color calibration | RGB 12.3 |

The information may include information on the resolution, the screen ratio and/or the color calibration of the display of the electronic device. Additionally, the information may include a model number of the electronic device to enable the rendering device to check access for example an online database to retrieve further information on a particular mobile display device type. This information as well as any other information may be sent in a series of different data formats, such as a JSON file, which may be parsed by the rendering device. Example of a JSON file defining some of the above-mentioned parameters is provided in the following Table 3:

TABLE 3 metadata sent to the rendering device in a JSON file

```
{"tablet_info": {
    "model_number": "Samsung - S10.19283"
    "physical_size":{
        "width":"10cm"
        "height":"20cm"
        "depth":"2cm"
    }
  }
}
```

The information about the physical size of the electronic device and other information about the electronic device that may be retrievable via a model number, a substantial amount of relevant information is provided that otherwise should have been deduced or calculated from image tracking algorithms. This information may be transmitted initially, at the start of the process, so that the margin for error is decreased and less processing is necessary by the AR.

Once the initial position and orientation of the electronic device is determined, the rendering device may receive regular updates of the position and orientation via the communication channel. In an embodiment, the device information may be sent based on a JSON file. An example of such file, comprising updates in changes in the position and orientation of an electronic device is illustrated in the following Table 4:

TABLE 4 message comprising update in position and orientation

| Example of data | Example values |
| --- | --- |
| Rotation (x, y, z) | X: 20<br>Y: 20<br>Z: 60 |

TABLE 4-continued message comprising update in position and orientation

| Example of data | Example values |
| --- | --- |
| Estimated translation | X: 2 cms |
|  | Y: −3 cms |
|  | Z: 4 cms |
| Screen brightness | 100 nits |
| PTS displayed | 01:00:00 |
| Clock time | 12:01:83.982 |

The updates sent to the rendering device allows the rendering device may be used to update an initial pose of the electronic device to a current pose, which may be used by the rendering device to render a virtual object in alignment with the electronic device. To obtain accurate alignment, updates may be sent at a sufficiently high rate taking into account the FPS of both displays. Additionally, the communication channel for sending the updates has a low latency. Here, low latency means that smaller than the time between frames. So, if a frame is shown every 40 ms (25FPS), then less than 40 ms may be defined as a low latency update.

The rendering engine may map the position and orientation of the electronic device in a virtual 3D space of the rendering engine. This way the rendering engine may determine translational movements and rotations that change the orientation and location of the electronic device. Based on these movements and rotations the rendering engine may determine a current pose of the electronic device which is used for rendering virtual objects in alignment with the electronic device.

Figure 5:
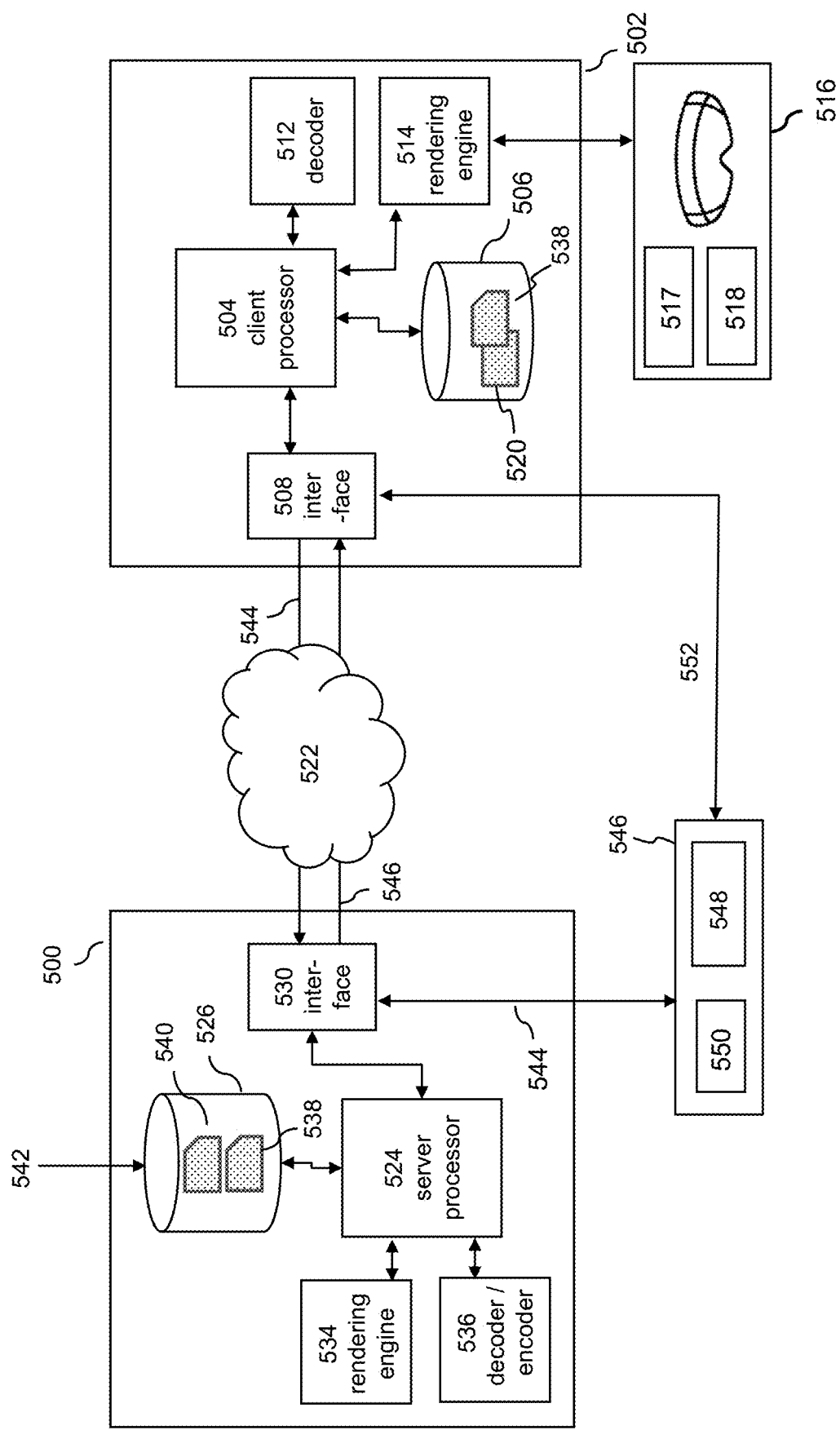
FIG. 5 depicts a system for rendering a virtual object in spatial alignment with a pose of an electronic device according to another embodiment of the invention.

FIG. 5 depicts a system for rendering a virtual object in spatial alignment with a pose of an electronic device according to an embodiment of the invention. The system may be an implementation of the rendering system as described with reference to FIG. 2 and may be configured to render a virtual object in spatial alignment with a pose of an electronic device as described with reference to FIG. 4. The rendering system may include a server system 500, a rendering device 502 configured to process content data and an electronic device 546.

The rendering device may include a client processor 504 connected to data storage 506, e.g. a buffer, and a network interface 508 for establishing communication with the server system. The rendering device may further include a decoder 512 for decoding content data received via the network interface from the server system and a rendering engine 514 for preparing the decoded content data for playout by an XR display device 516. The XR display device may include or be associated a camera, e.g. a tracking camera. Further, the XR display device may include one or more sensors 518 which are configured to measure sensor information about the user using the XR display device, wherein the information may include: user location, viewing direction, gaze, face expression, movement and/or pose information. In an embodiment, the one or more sensor may include an inertial measurement unit IMU. In an embodiment, at least part of the one or more sensors may be part of the XR display device and/or rendering device. In another embodiment, part of the sensors may be wirelessly connected to the XR display device and/or rendering device.

The client apparatus may use at least part of the measured sensor information, e.g. a viewing direction, to request content from the server system that matches the viewport of the user. During rendering the rendering device may receive content data 520 and metadata 521 associated with the content data, which may be stored in the buffer of the rendering device. Depending on the implementation, the metadata may include e.g. a manifest file identifying video segments that can be requested from the server, and/or scene descriptors defining 3D objects for different scenes.

Similar to the rendering system of FIG. 2, electronic device 546 may comprise a client device for setting up a communication channel 544 with the server system. The electronic device may further include a sensor module 550 configured to measure orientation, motion and/or position information associated with the electronic device. To that end, the electronic device may include an inertial measurement unit (IMU). Further, in some embodiments, the electronic device may include a GPS system for determining position information which can be sent in the device information to the rending device. Additionally, and/or in addition, a positioning system, such as a triangulation system, may be used to determine the position of the electronic device, which may be sent to the rending device.

Additionally, the electronic device may be configured to establish a direct wireless communication link 552 with other electronic devices, such as rendering device 502. This wireless communication link may be based on any wireless communication protocol that can be used to establish a wireless connection between the electronic device and the rendering device. In some embodiments, the electronic device may include a display 548 or may be (wirelessly) connected to a display. In that case, the electronic device may form an electronic display device. Such electronic display device may include a client device for requesting transmission of content data in a first content stream to the electronic device. In various embodiments, the electronic device may be a mobile phone, a tablet, an XR rendering device such as a HMD or XR glasses, an Internet-of-Things IoT device, a mobile robot or an unmanned aerial vehicle UAV such as a drone.

Server system 500 may include a server processor 524, a network interface 530 for establishing communication with the rendering device and a storage medium 526 for storing assets that can be played out by the XR display device. The server system may be further configured to receive assets 542 from other server systems or a content authoring system and store these assets on the storage medium. The assets stored on the storage medium may include content data 538, including for example video data and synthetic image data, such as point cloud, textures and 3D models, and adaptation information 540 associated with the content data. In further embodiment, a scene descriptor file may be stored at the storage medium, which describes the 3D objects that belong to a certain scene. The server system may be configured to receive a request for content data from the client apparatus of the rendering device via a network 522 which connects the rendering device to the server system.

The client processor of the rendering device may send a request 544 for content data to the server system. The request may include information, e.g. content identifiers, viewing direction, etc., that can be used by the server system to select the requested content data. The server system may send the requested content data in one or more content streams 546 to the rendering device, which will process the data in the one or more content streams so that it can be displayed by the XR display device. Here, the processing by the client processor may include decoding the content data, which may include video data and synthetic data such as a mesh, a texture or a 3D model, and providing decoded content data to the rendering device which will prepare the decoded data for playout by the XR display device. Here, the rendering process prepares the decoded data for the XR display device, which may for example include embedding or combining the video data with the synthetic data and formatting the processed data in a format so that it can be displayed by the XR display device.

During the content rendering, device information may be sent by an electronic device over the communication channel to a rendering engine, so that the rendering engine may use this information when rendering objects in alignment with the pose of the electronic device. In some embodiments, the rendering engine may be located in the rendering device, e.g. a HMD or AR glasses. In other embodiments, the server system may be configured to render content data and send the content data to the rendering device. In that case, the server system may include a rendering agent 534 and a decoder/encoder system 536. The server system may process the content data, that includes video data and/or synthetic image data representing virtual objects, and transmit the content data to the rendering agent, that will process content data so that it can be displayed by the XR display device. Here, the processing by the server system may include decoding the content data by decoder 536, which may include video data and synthetic image data and providing the decoded content data to the rendering engine 534, which prepares the decoded data for playout by the XR display 516 of the rendering device 502. Here, the rendering process prepares the decoded data for the XR display device, which may for example include embedding or combining the video data with the synthetic data and formatting the resulting data so that it can be processed by the XR display device. Server-based rendering is especially advantageous where the XR display device is a wireless XR display such as AR glasses that has limited battery and processing capabilities.

The process may include a decoder decoding encoded content data that is stored on the storage medium of the server system, so that 2D or 3D models and/or textures may be added to the content or pixels values (e.g. color and/or brightness) may be changed. The content data may be rendered by the rendering engine of the server system, encoded and subsequently transmitted to the rendering device 502, which may process the content data so that it can be played out by the XR display device 516.

In an embodiment, the network interface of the server system may be a wired communication interface, such as an Ethernet or fiber-optic based interface. The network may for example be the Internet or a mobile network, wherein the streaming server may be connected to a fixed part of the mobile network. Alternatively, in another embodiment, the network interface may be a wireless communication interface, which may also be referred to as a radio interface, and which may be configured to connect to a mobile network infrastructure. In some examples, the network interface may comprise a radio interface, for example an 4G or 5G radio interface for connecting to a 4G or 5G mobile network adhering to one or more 3GPP standards, or a Wi-Fi communication for connecting to a Wi-Fi network infrastructure or any other wireless interface.

In an embodiment, the rendering device may be implemented as an XR rendering device, which is configured to execute the processing steps (or a subset thereof) as described with reference to FIG. 4. In an embodiment, the process may include retrieving an XR scene descriptor file for a scene to be rendered by the XR rendering device. Such scene descriptors are known from ISO/IEC DIS 23090-14 Part 14: Scene Description for MPEG Media. Based on the XR scene descriptor file, the client processor may identify and download 3D assets, e.g., from the server system. In some examples, the client processor may download 3D assets of associated with a scene, while in other examples, the client may download only part of all 3D assets, e.g., only those 3D assets which are visible from a user's viewpoint in the scene.

In various embodiments, the XR rendering may be implemented as, associated with or part of a pair of tethered or untethered AR glasses, an HMD or an AR heads-up display, which may be configured to render spatially aligned 3D and 2D assets over an external environment, e.g., over the viewer's physical surroundings. In an embodiment, the server system may act as rendering server for the XR rendering device and may include a storage medium comprising content data of the scene to be rendered, including descriptor files, 3D/2D assets representing 3D/2D graphics objects, etc. Further, the server system may have the ability to render part of a scene, e.g., as an omnidirectional frame, encode/transcode, package, and distribute the rendered scene part and any other generated assets.

During operation, the XR client processor may retrieve one or more descriptor files that contain information on the scene and the available and/or required assets. The assets themselves may be stored at/by the server system or another server, e.g. a content or media server, connected to the server system. In an embodiment, the server system or the content server may be part of a content delivery network CDN. The descriptor files may include, or represent, the scene descriptor data as described elsewhere. Based on the scene descriptor data, the XR client processor may download those assets which are needed to render the scene. In some embodiments, the client may download all assets so that a scene may be rendered offline, e.g., even if network connectivity is interrupted. After parsing the descriptor(s), e.g., as contained in the scene descriptor data, the XR client processor may select which of the required assets are to be rendered, for example on the basis of criteria such as visibility.

Streaming technologies that may be used for streaming content data, including the affect-adapted content data, to the client apparatus may include HTTP adaptive streaming (HAS) schemes, for example MPEG-DASH and HTTP Live Streaming (HLS), that specify adaptive bitrate video streaming schemes based on video data and associated metadata. The content data may be organized and structured based on a certain data format which may be defined by a HAS streaming standard or MPEG-CMAF which describes encoding and packaging schemes for segmented objects. CMAF is an ISO standard developed by MPEG harmonizing codec profiles and segment formats for HAS schemes such as MPEG-DASH and HLS. In some embodiments, the data format of the content data may include playback periods including one or more adaptation sets, an adaptation set including media representations of different resolution and/or quality and a representation including a sequence of media segments, wherein a media segment includes a compressed video data of a predetermined quality.

The metadata associated with the video data may be organized in a manifest file or a manifest file update patch, which includes metadata to transform a manifest file a client apparatus is currently using, into a manifest file for the next playback period. During the video creation process manifest files may be generated and stored together with the video data on a media storage device. A manifest file may be referred to in MPEG DASH as a Media Presentation Description (MPD) and may be structured in accordance with a certain machine-readable document format, e.g. XML, JSON or the like. A manifest file may comprise information about media assets, e.g. media streams including video and audio streams, that are available to the client apparatus and information how a client apparatus can retrieve these media assets. A manifest file may include segment identifiers, e.g. in the form of URLs, so that a client apparatus is able to request video segments from a server. Different ways for signaling the segment identifiers may be used e.g. URL templating, explicit URLs, etc.

The video streaming connection between server system and client apparatus may be based on the RTP protocol or based on RTSP over UDP for the lowest amount of delay. A connection may be established both on video stream level and on WebSocket level to be able to transmit client information, e.g. metadata needed for the streaming. Alternatively, an adaptive streaming protocol such as DASH may be used.

In an embodiment, the server may be a so-called edge server, i.e. a server which is located at the edge of a network. An edge server may for example be co-located with a base station of a wireless telecommunication network. This way, the edge server is physically located relatively close to client apparatuses that are connected to the base station. This way a fast, low-delay data connection may be established between the edge server and a client apparatus. For example, the connection between the edge server and the client apparatus may e.g. be based on the 5G standard having a latency lower than the motion-to-high-quality latency that is required to enable an immersive experience by the user of the video processing device. For example, a Mobile Edge Computing or Multi-access Edge Computing (MEC) unit may be used wherein storage, networking resources and data processing, such as the video processing described with reference to the embodiments in this disclosure, may be integrated or associated with a base station, e.g. an eNodeB, that is part of a radio access network (RAN). This way, computer intensive and latency sensitive applications like multi-view video and augmented reality applications may be hosted at the edge of the network. The connection between the edge-server and the client apparatus thus provides a fast data communication channel.

It is noted that the data communication between the streaming client and the streaming server may involve multiple networks. For example, the streaming client may be connected via a radio access network to a mobile network's infrastructure and via the mobile network's infrastructure to the Internet, with the streaming server being a server which is also connected to the Internet.

The server processor may be configured, e.g., by hardware design or software, to perform the operations described in this application in as far as pertaining to a streaming server or in general to the streaming of video data of multi-view video of a scene to a client apparatus. In general, the processor may be embodied by a single Central Processing Units (CPU), such as a x86 or ARM-based CPU, but also by a combination or system of such CPUs and/or other types of processing units. The server may be distributed over different entities, e.g., over different servers. In that case, the processor may also be distributed, e.g., over the CPUs of such different servers. The server system may comprise one or more data storage devices, such as a hard drive or an array of hard drives, a solid-state drive or an array of solid-state drives, etc., which may be used to store data. In an embodiment, the server may be a content delivery node, or may be implemented in a distributed manner using a number of content delivery nodes. In an embodiment, the content delivery nodes may be part of a content delivery network (CDN). The streaming server may also be implemented by another type of server or a system of such servers. For example, the streaming server may be implemented by one or more cloud servers or by one or more edge nodes of a mobile network.

Similar to the server network interface, the client network interface may be a wired or a wireless network interface. For example, a radio network interface such as a 4G or 5G radio interface for connecting to a 4G or 5G mobile network adhering to one or more 3GPP standards, or a Wi-Fi communication interface for connecting to a Wi-Fi network infrastructure, etc. The data communication between the client and the server may involve multiple networks. For example, the streaming client may be connected via a radio access network to a mobile network's infrastructure and via the mobile network's infrastructure to the Internet, with the streaming server being a server which is also connected to the Internet. The client apparatus may further comprise a processor configured, e.g., by hardware design or software, to perform the operations described in this specification in as far as pertaining to a client apparatus or in general to the receiving, by streaming, of video data of multi-view videos of a scene. In general, the processor may be embodied by a single Central Processing Unit (CPU), such as a x86 or ARM-based CPU, but also by a combination or system of such CPUs and/or other types of processing units, such as Graphics Processing Units (GPUs).

Generally, the client apparatus may be embodied by a (single) device or an apparatus capable of processing video data, e.g., a smartphone, personal computer, laptop, tablet device, gaming console, set-top box, television, monitor, projector, smart watch, smart glasses, media player, media recorder, etc. In some examples, the client apparatus may be a so-called User Equipment (UE) of a mobile telecommunication network, such as a 5G or next-gen mobile network. In other examples, the client apparatus may be an edge node of a network, such as an edge node of the aforementioned mobile telecommunication.

Figure 6:
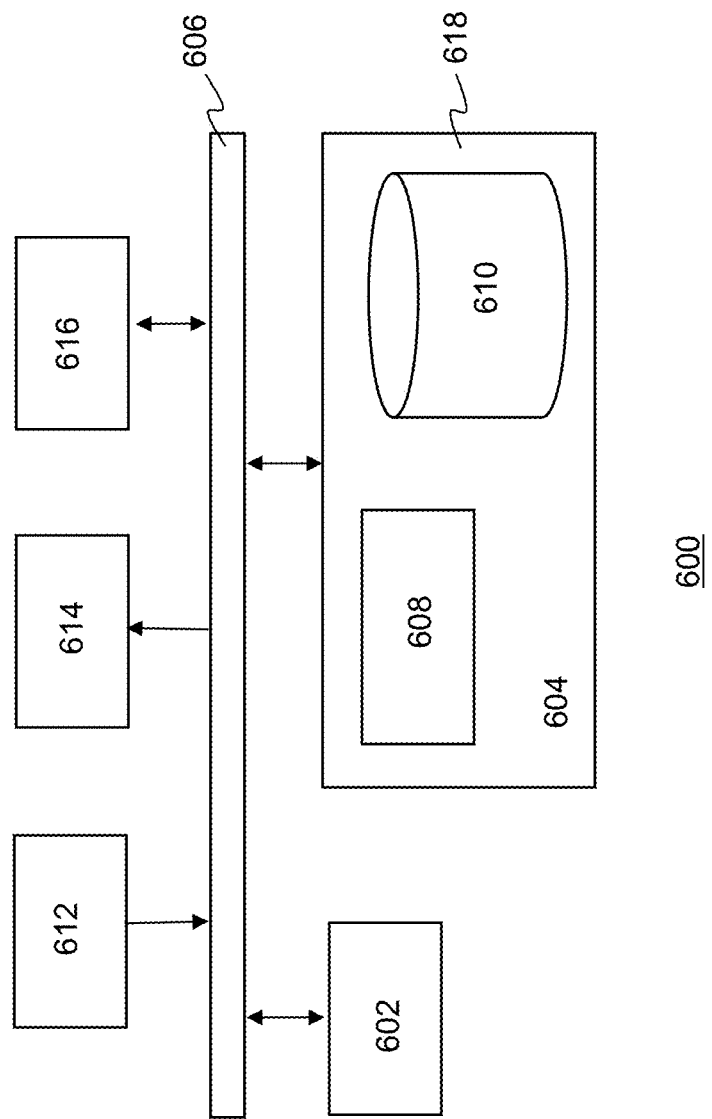
FIG. 6 is a block diagram illustrating an exemplary data processing system that may be used in as described in this disclosure.

FIG. 6 is a block diagram illustrating an exemplary data processing system that may be used in as described in this disclosure. Data processing system 600 may include at least one processor 602 coupled to memory elements 604 through a system bus 606. As such, the data processing system may store program code within memory elements 604. Further, processor 602 may execute the program code accessed from memory elements 604 via system bus 606. In one aspect, data processing system may be implemented as a computer that is suitable for storing and/or executing program code. It should be appreciated, however, that data processing system 600 may be implemented in the form of any system including a processor and memory that is capable of performing the functions described within this specification.

Memory elements 604 may include one or more physical memory devices such as, for example, local memory 608 and one or more bulk storage devices 610. Local memory may refer to random access memory or other non-persistent memory device(s) generally used during actual execution of the program code. A bulk storage device may be implemented as a hard drive or other persistent data storage device. The processing system 600 may also include one or more cache memories (not shown) that provide temporary storage of at least some program code in order to reduce the number of times program code must be retrieved from bulk storage device 610 during execution.

Input/output (I/O) devices depicted as input device 612 and output device 614 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 616 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 600.

As pictured in FIG. 6, memory elements 604 may store an application 618. It should be appreciated that data processing system 700 may further execute an operating system (not shown) that can facilitate execution of the application. Application, being implemented in the form of executable program code, can be executed by data processing system 700, e.g., by processor 702. Responsive to executing application, data processing system may be configured to perform one or more operations to be described herein in further detail.

In one aspect, for example, data processing system 600 may represent a client data processing system. In that case, application 618 may represent a client application that, when executed, configures data processing system 600 to perform the various functions described herein with reference to a "client". Examples of a client can include, but are not limited to, a personal computer, a portable computer, a mobile phone, or the like.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method of rendering a virtual object by a rendering device, the method comprising:
  establishing by the rendering device a communication channel with a mobile electronic device, the mobile electronic device being an electronic display device, the electronic display device having a physical display and a screen plane, the electronic display device comprising an inertial measurement unit, IMU;
  determining or receiving initial pose information of the electronic display device, the initial pose information defining an initial position and an initial orientation;
  receiving device information via the communication channel, the device information including orientation information, motion information, and/or position information for updating the initial pose of the electronic display device, at least part of the orientation information and/or motion information being generated by the IMU, the device information further including at least one of information about physical dimensions of the electronic display device and/or physical dimensions of the physical display of the electronic display device;
  using the initial pose information and the device information to determine a current pose of the electronic display device, the current pose defining a current position and orientation;
  receiving first content data from a server system, the first content data representing a virtual object, the virtual object being a virtual plane; and,
  rendering the first content data in a viewport of the rendering device based on the current pose, wherein the current pose is used to spatially align the virtual object in co-planar spatial alignment with the screen plane of the electronic display device for extending the physical display of the electronic display device.

2. Method according to claim 1 wherein the device information further includes at least one of: information about a screen ratio of the electronic display device, color information associated with the physical display of the electronic display device, a model number of the electronic display device, information of a presentation time and/or clock time when the orientation, motion and/or position of the electronic display device was measured.

3. Method according to claim 1 wherein determining initial pose information further includes:
  using a depth sensor or a depth camera to determine a distance between the electronic display device and the rendering device; and,
  determine the initial position of the electronic display device based on the distance.

4. Method according to claim 3 wherein determining initial pose information further includes:
  determining an initial orientation of the electronic display device based on tracking the electronic display device in pictures generated by a camera of the rendering device and based on image processing of the tracked electronic display device in the pictures; or,
  receiving an initial orientation of the electronic display device via the communication channel, the initial orientation being determined by the inertial measurement unit of the electronic display device.

5. Method according to claim 1 wherein the communication channel is a wireless communication channel between the electronic display device and the rendering device.

6. Method according to claim 1 wherein the communication channel between the electronic display device and the rendering device is established via a server system.

7. Method according to claim 1 wherein the virtual object represents a virtual display extension of the physical display of the electronic display device, wherein the virtual display extension provides an extended view of content that is played back by the electronic display device.

8. A rendering device comprising:
a computer readable storage medium having computer readable program code embodied therewith, and a processor, preferably a microprocessor, coupled to the computer readable storage medium, wherein responsive to executing the computer readable program code, the processor is configured to perform executable operations comprising:
establishing a communication channel with a mobile electronic device, the mobile electronic device being an electronic display device, the electronic display device comprising an inertial measurement unit, IMU;
determining or receiving initial pose information of the electronic display device, the initial pose information defining an initial position and an initial orientation;
receiving device information via the communication channel, the device information including orientation information, motion information, and/or position information for updating the initial pose of the electronic display device, the device information further including at least one of information about the physical dimensions of the electronic display device and/or physical dimensions of the display of the electronic display device;
using the initial pose information and the device information to determine a current pose of the electronic display device, the current pose defining a current position and orientation, at least part of the orientation information and/or motion information being generated by the IMU;
receiving first content data from a server system, the first content data representing a virtual object, the virtual object being a virtual plane; and,
rendering the first content data in a viewport of the rendering device based on the current pose, wherein the current pose is used to spatially align the virtual object in co-planar spatial alignment with the screen plane of the electronic display device for extending the physical display of the electronic display device.

9. Method according to claim 6, wherein the method comprises receiving synchronization information via the communication channel for synchronization of the rendering of the first display extension and the content.

10. Computer program product comprising a non-transitory computer readable medium containing software code portions configured for, when run in memory of a computer, executing the method steps according to claim 1.

11. Rendering device according to claim 8
wherein the device information further includes at least one of: information about a screen ratio of the electronic display device, color information associated with the physical display of the electronic display device, a model number of the electronic display device, information of a presentation time and/or clock time when the orientation, motion and/or position of the electronic display device was measured.

12. Rendering device according to claim 8 wherein determining initial pose information further includes:
using a depth sensor or a depth camera to determine a distance between the electronic display device and the rendering device; and,
determine the initial position of the electronic display device based on the distance.

13. Rendering device according to claim 12 wherein determining initial pose information further includes:
determining an initial orientation of the electronic display device based on tracking the electronic display device in pictures generated by a camera of the rendering device and based on image processing of the tracked electronic display device in the pictures; or,
receiving an initial orientation of the electronic display device via the communication channel, the initial orientation being determined by the inertial measurement unit of the electronic display device.

14. Rendering device according to claim 8 wherein the communication channel is a wireless communication channel between the electronic display device and the rendering device.

15. Rendering device according to claim 6, wherein the virtual object represents a virtual display extension of the physical display of the electronic display device, wherein the virtual display extension provides an extended view of content that is played back by the mobile display device, the rendering device further configured for receiving synchronization information via the communication channel for synchronization of the rendering of the first display extension and the content.

* * * * *

UNITED STATES PATENT AND TRADEMARK OFFICE
CERTIFICATE OF CORRECTION

Page 1 of 1

PATENT NO. : 12,288,303 B2
APPLICATION NO. : 18/083352
DATED : April 29, 2025
INVENTOR(S) : Alexandre da Silva Pratas Gabriel, Hans Maarten Stokking and Tessa Esmeé Klunder It is certified that error appears in the above-identified patent and that said Letters Patent is hereby corrected as shown below:

In the Claims

In Claim 15, Column 24, Line 41, delete "claim 6," and insert -- claim 8, --.

Signed and Sealed this
Fifth Day of August, 2025

Coke Morgan Stewart
*Acting Director of the United States Patent and Trademark Office*